(12) United States Patent
Lambert et al.

(10) Patent No.: US 9,128,902 B2
(45) Date of Patent: Sep. 8, 2015

(54) SYSTEMS AND METHODS FOR MANAGING DISASTER RECOVERY IN A STORAGE SYSTEM

(71) Applicant: NetApp, Inc., Sunnyvale, CA (US)

(72) Inventors: Laurent Lambert, Santa Cruz, CA (US); Chaitanya Patel, Morrisville, NC (US); Hrishikesh Tapaswi, Sunnyvale, CA (US); Sue Coatney, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 140 days.

(21) Appl. No.: 13/870,680

(22) Filed: Apr. 25, 2013

(65) Prior Publication Data

US 2014/0325256 A1 Oct. 30, 2014

(51) Int. Cl.
*G06F 11/00* (2006.01)
*G06F 11/20* (2006.01)

(52) U.S. Cl.
CPC .................................. *G06F 11/2094* (2013.01)

(58) Field of Classification Search
USPC ........................................................ 714/4.11
See application file for complete search history.

(56) References Cited

U.S. PATENT DOCUMENTS

| | | | |
|---|---|---|---|
| 8,161,321 B2* | 4/2012 | Zheng et al. | 714/15 |
| 2007/0217420 A1* | 9/2007 | Raj et al. | 370/392 |
| 2010/0043067 A1* | 2/2010 | Varadhan et al. | 726/13 |
| 2010/0180106 A1* | 7/2010 | Grinshpun et al. | 712/228 |
| 2010/0251002 A1* | 9/2010 | Sivasubramanian et al. | 714/2 |
| 2010/0251242 A1* | 9/2010 | Sivasubramanian et al. | 718/100 |
| 2010/0251339 A1* | 9/2010 | McAlister | 726/4 |
| 2011/0083138 A1* | 4/2011 | Sivasubramanian et al. | 719/328 |
| 2011/0099420 A1* | 4/2011 | MacDonald McAlister et al. | 714/6.32 |
| 2013/0198558 A1* | 8/2013 | Rao et al. | 714/4.2 |
| 2014/0279884 A1* | 9/2014 | Dantkale et al. | 707/620 |

* cited by examiner

*Primary Examiner* — Kamini Patel
(74) *Attorney, Agent, or Firm* — Cooper Legal Group, LLC

(57) ABSTRACT

Systems and methods for providing for efficient switchover for a client in a storage network between the use of one or more a primary storage resources to one or more disaster recovery (DR) resources are provided herein. Embodiments may implement synchronization between such resources on a data plane and a control plane to allow for a transition between resources to be implemented in a manner that is minimally disruptive to a client. Moreover, embodiments may provide for processing resources which allow for switching a client between a primary storage resource to a secondary storage resource with minimal administrative interaction.

23 Claims, 5 Drawing Sheets

SYSTEMS AND METHODS FOR MANAGING DISASTER RECOVERY IN A STORAGE SYSTEM

TECHNICAL FIELD

The present invention relates generally to management of data within file systems and, more particularly, management of data which is mirrored in multiple locations in a storage network.

BACKGROUND OF THE INVENTION

The creation and storage of digitized data has proliferated in recent years. Accordingly, techniques and mechanisms that facilitate efficient and cost effective storage of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof. The foregoing data storage systems may comprise one or more data storage devices configured to store digital data within data volumes.

Digital data stored by data storage systems may be frequently migrated and replicated within the data storage system and/or between data storage systems during normal operation. For example, data storage systems may include disaster recovery (DR) resources that function as a backup for a primary storage resource. Other networks may provide for high availability (HA) resources that are configured to assist a primary storage resource when desired, e.g. during high traffic periods, to provide for faster data transfers. Such DR and HA systems obtain replicated information of data residing on a primary storage resource.

In order to replicate information from a primary storage resource to a secondary storage resource, previous systems may utilize write cache that compiles write data from a client which is then stored to a more permanent storage location according to a pre-determined schema. For example, the write cache may be part of a DR node and function to compile data for the DR node until the cache resources are near full (or until another pre-determined condition is met), at which point the data residing on the write cache is transferred to DR storage. The point when write cache is cleared and its contents sent to storage may be referred to as a consistency point.

It is notable, however, that while data is replicated to DR resources, presently the transition between the actual use of a primary storage resource and a DR resource is time consuming and disruptive to a client. In many instances, the mirrored data is mirrored with a significant delay in time. As such, not all of the stored data may be available to a client in the event that the primary node ceases functioning. Further, in making the transition between resources, various controls and configuration information must be established in order to properly insure communications between a client and the correct transitioned storage volumes. Establishing such controls is time consuming and can become administratively complicated. In fact, establishing communication configurations is often accomplished on a manual basis where an administrator must manually select and assign resources for a client.

It is further noted that the above-mentioned issues found in transitioning between a primary resource and a DR resource may also be apparent when implementing switchback procedures. For example, a primary resource may be brought back online and resynchronize data with the DR node, but the requisite control data and commands to administer the primary storage resource will still need to be reestablished using the same methods.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
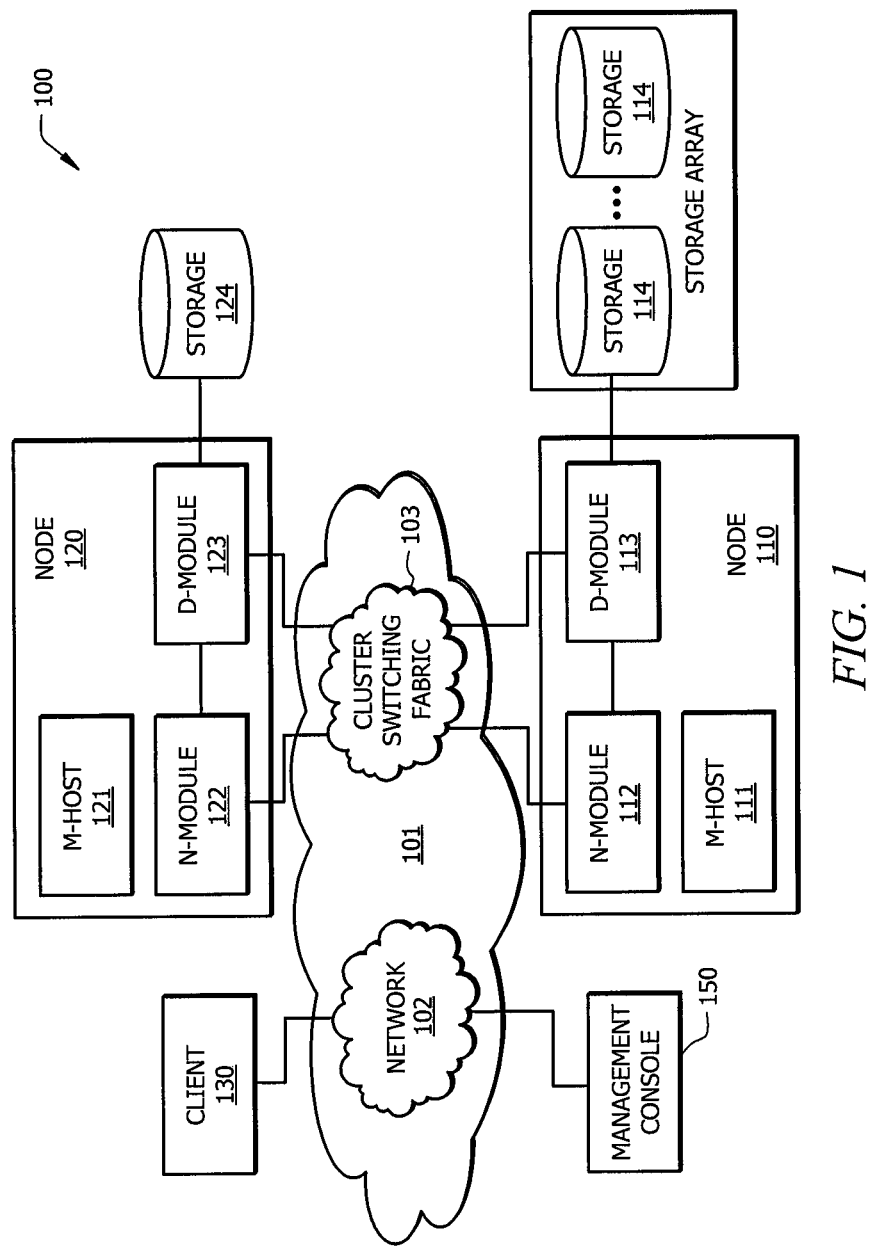
FIG. 1 provides a block diagram of a storage system in accordance with an embodiment of the present invention.

The present application provides for systems and methods which implement efficient switchover for a client in a storage network between the use of one or more a primary storage resources to one or more secondary resources, such as DR resources. Embodiments may implement synchronization between such resources on a data plane and a control plane to allow for a later transition between resources to be implemented in a manner that is minimally disruptive to a client.

On the data plane, embodiments may utilize an asynchronous resource (e.g. a RAID system and the like) and a near synchronous write cache resource. The write cache may receive data from a client device and synchronize the data with the asynchronous resource at various points in time to create consistency points. On the control plane, embodiments may provide for one or more virtual servers that include configuration information for the storage network to be replicated to secondary resources and remain dormant on the secondary resources while the primary storage resources are functional. Upon receiving a switchover command, one or more dormant virtual servers may be activated in a manner that allows an efficient transition between resources for a client.

Embodiments may also provide for processing resources at various levels in a storage network, e.g. at a management level, a cluster level and a node level, which may coordinate in a manner which simplifies switchover procedures for an administrator commanding a switchover. For example, one or more nodes may include processing capabilities which receive a switchover command from the storage system (e.g. from an administrator) and translates that command into multiple tasks that must be implemented in order to perform the switchover task. Such processing capabilities may also function to monitor these tasks within various portions of a node or cluster and provide feedback where appropriate to allow other tasks to complete.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

FIG. 1 provides a block diagram of storage system 100 in accordance with an embodiment of the present invention. System 100 includes a storage cluster having multiple nodes 110 and 120 which are adapted to communicate with each other and any additional node of the cluster. Nodes 110 and 120 are configured to provide access to data stored on a set of storage devices (shown as storage devices 114 and 124) constituting storage of system 100. Storage services may be provided by such nodes implementing various functional components that cooperate to provide a distributed storage system architecture of system 100. Additionally, one or more storage devices, such as storage array 114, may act as a central repository for storage system 100. It is appreciated that embodiments may have any number of edge nodes such as multiple nodes 110 and/or 120. Further, multiple storage arrays 114 may be provided at the multiple nodes 110 and/or 120 which provide resources for mirroring a primary storage data set.

Illustratively, nodes (e.g. network-connected devices 110 and 120) may be organized as one or more network elements (N-modules 112 and 122) and/or storage elements (D-modules 113 and 123) and a management element (M-host 111 and 121). N-modules may include functionality to enable nodes to connect to one or more clients (e.g. network-connected device 130) over computer network 101, while D-modules may connect to storage devices (e.g. as may implement a storage array). M-hosts may provide cluster communication services between nodes for generating information sharing operations and for presenting a distributed file system image for system 100. Functionality for enabling each node of a cluster to receive name and object data, receive data to be cached, and to communicate with any other node of the cluster may be provided by M-hosts adapted according to embodiments of the invention.

It should be appreciated that network 101 may comprise various forms, and even separate portions, of network infrastructure. For example, network-connected devices 110 and 120 may be interconnected by cluster switching fabric 103 while network-connected devices 110 and 120 may be interconnected to network-connected device 130 by a more general data network 102 (e.g. the Internet, a LAN, a WAN, etc.).

It should also be noted that while there is shown an equal number of N- and D-modules constituting illustrated embodiments of nodes, there may be a different number and/or type of functional components embodying nodes in accordance with various embodiments of the present invention. For example, there may be multiple N-modules and/or D-modules interconnected in system 100 that do not reflect a one-to-one correspondence between the modules of network-connected devices 110 and 120. Accordingly, the description of network-connected devices 110 and 120 comprising one N- and one D-module should be taken as illustrative only and it will be understood that the novel technique is not limited to the illustrative embodiment discussed herein.

Network-connected device 130 may be a general-purpose computer configured to interact with network-connected devices 110 and 120 in accordance with a client/server model of information delivery. To that end, network-connected device 130 may request the services of network-connected devices 110 and 120 by submitting a read or write request to the cluster node comprising the network-connected device. In response to the request, the node may return the results of the requested services by exchanging information packets over network 101. Network-connected device 130 may submit access requests by issuing packets using application-layer access protocols, such as the Common Internet File System (CIFS) protocol, Network File System (NFS) protocol, Small Computer Systems Interface (SCSI) protocol encapsulated over TCP (iSCSI), and SCSI encapsulated over Fibre Channel (FCP) for instance.

System 100 may further include a management console (shown here as management console 150) for providing management services for the overall cluster. Management console 150 may, for instance, communicate with network-connected devices 110 and 120 across network 101 to request operations to be performed at the cluster nodes comprised of the network-connected devices, and to request information (e.g. node configurations, operating metrics) from or provide information to the nodes. In addition, management console 150 may be configured to receive inputs from and provide outputs to a user of system 100 (e.g. storage administrator) thereby operating as a centralized management interface between the administrator and system 100. In the illustrative embodiment, management console 150 may be networked to network-connected devices 110-130, although other embodiments of the present invention may implement management console 150 as a functional component of a node or any other processing system connected to or constituting system 100.

Management console 150 may also include processing capabilities and code which is configured to control system 100 in order to allow for management of switchover between resources on storage system 100. For example, system 100 may include a primary storage node for storing data and multiple secondary nodes which are configured act as DR resources for the primary node. In such an example system, management console 150 may establish/control which nodes are utilized for DR resources, control messages between a client and the selected nodes, monitor the nodes for failures, control switchover between nodes in the event of a failure and control resynchronization of nodes coming back online after failures. These processing functions may also be shared between, or may be implemented in cooperation with one or more M-hosts 111 and 121 within nodes 110 and 120.

In a distributed architecture, network-connected device 130 may submit an access request to a node for data stored at a remote node. As an example, an access request from network-connected device 130 may be sent to network-connected device 120 which may target a storage object (e.g. volume) on network-connected device 110 in storage 114. This access request may be directed through network-connected device 120 due to its proximity (e.g. it is closer to the edge than a device such as network-connected device 110) or ability to communicate more efficiently with device 130. To accelerate servicing of the access request and optimize cluster performance, network-connected device 120 may cache the requested volume in local memory or in storage 124. For instance, during initialization of network-connected device 120 as a cluster node, network-connected device 120 may request all or a portion of the volume from network-connected device 110 for storage at network-connected device 120 prior to an actual request by network-connected device 130 for such data.

As can be appreciated from the foregoing, in order to operate as a cluster (e.g. the aforementioned data storage system), network-connected devices 110-130 may communicate with each other. Such communication may include various forms of communication (e.g. point-to-point or unicast communication, multicast communication, etc.). Accordingly, to effectively cooperate to provide desired operation as a logical entity, each node of a cluster is provided with the capability to communicate with any and all other nodes of the cluster according to embodiments of the invention.

Figure 2:
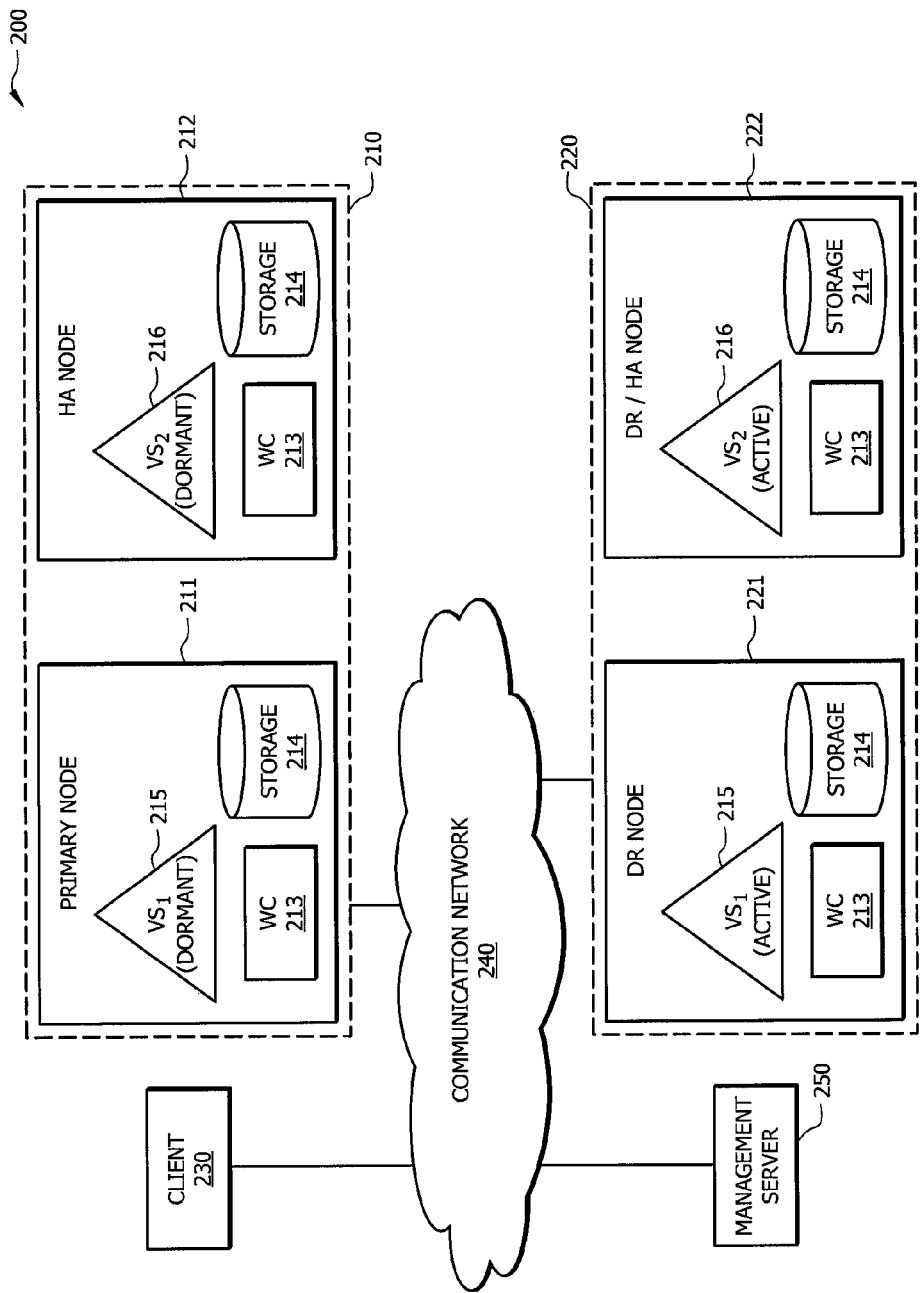
FIG. 2 illustrates a DR/HA storage network in accordance with an embodiment of the present application.

FIG. 2 illustrates a DR/HA storage network 200 in accordance with an embodiment of the present application. It is noted that while much of the discussion herein of embodiments and functionality of the invention is made in the context of being implemented in a DR/HA environment, embodiments may be implemented within many types of networks (such as storage system 100). Further, various nodes and devices of storage network 200 may be implemented in the manner as discussed above with respect to the devices and functionality of storage system 100.

DR/HA storage network 200 includes a first cluster 210 having primary node 211 and HA node 212, and a second cluster 220 which is remotely located with respect to first cluster 210 and has DR node 221 and DR/HA node 222. A client 230 may write data which is directed to primary node 211 of first cluster 210 via communication network 240. Additionally, management server 250 comprises processing circuitry which is configured to provide for control of the information flow across DR/HA storage network 200.

It is noted that various portions of DR/HA storage network 200 (e.g. the nodes, communications, clients, management console/server etc.) may be implemented as discussed above with respect to storage system 100. It is further noted that first cluster 210 and second cluster 220 may include additional nodes, however, the presently illustrated embodiment has been simplified for the sake of describing the novel concepts provided for herein. Additionally, the designation of primary node 211, HA node 212 and DR node 221 are set forth with respect to client 230. In some embodiments, a different client may utilize DR node 221 as a primary node, DR/HA node 222 as an HA node, and primary node 211 would be the DR node with respect to the different client. Such clients may exist simultaneously in DR/HA storage network 200 in accordance with embodiments described herein. Further, management server 250 may be implemented as a stand-alone processing server, may function in conjunction with processing capabilities of one or more nodes, or may be implemented entirely within the processing capabilities of one or more nodes.

In one use example, management server 250 may establish a primary node for storing information, such as primary node 211, for client device 230. Management server 250 may also establish one or more secondary nodes which are configured to mirror the information written to primary node 211. Determining the primary and secondary nodes may be accomplished manually or automatically. For example, the designation of a primary node and secondary nodes may be implemented by an administrator with access to management server 250. Additionally, automated determinations may be implemented where a determination is based on one or more system properties (e.g. capacity of particular nodes, communication capabilities and/or bandwidth between nodes, etc.).

In the illustrated DR/HA storage network 200, client 230 may be assigned HA node 212 and DR node 221 as mirroring nodes. In this manner, client 230 may initiate a write command which causes data to be written or modified in primary node 211, whereupon management server 250 causes the data to also be written within DR node 221. If HA functionality is desired, management server 250 may also cause the data to be written within HA node 212.

Management server 250 may be configured to manage the node partitions used by a client and retain information regarding addressing/extensions of these partitions and any other information which is helpful to control data flow and monitor the functions of devices communicating within DR/HA network 200. For example, management server 250 may be configured to monitor the network devices for various states such as states which reflect whether: the primary storage node 211 is online, the HA node 212 is online and synchronized with primary node 211, and whether the DR node is online and synchronized with the primary storage node 211 and/or HA node 212. States which reflect whether mirror devices have lost communication, or whether switchovers have occurred (e.g. a switchover from a primary node to a DR node), etc., may also be monitored. Such monitoring may be implemented in any manner which provides relevant data to management server 250. For example, various portions of DR/HA network 200 may be configured to provide a periodic signal (e.g. a heartbeat signal) to one or more devices in the network. Management server 250 may monitor such signals to determine whether a particular device is functioning properly. Additionally, in some embodiments, management server 250 may periodically ping one or more devices in DR/HA network 200 and monitor the response to determine whether a particular device is functioning properly. Further, in some instances, a device which is experiencing abnormal operations may also be configured to provide error messages to management server 250. When management server 250 discovers a problem (e.g. receives an error message, fails to receive a heartbeat signal or a response to a test signal, etc.) within DR/HA storage network 200, management server 250 may initiate failure procedures.

Each node of FIG. 2 is illustrated as including a write cache (WC) portion 213 and a storage portion 214 which are designated for client 230. It is noted that write cache 213 may temporarily contain data written by client 230 and may contain metadata which assists in the functioning of the overall storage network 200. Storage portion 214 contains storage data on a more permanent basis. In some embodiments write cache portion 213 may store data on a device which is separate from data stored on storage portion 214, while in other embodiments, such storage may be implemented on the same device. Further, as illustrated, storage portion 214 is part of an overall node, however, such storage may be implemented within its own array that is in communication with a node (such as illustrated with respect to storage 114 and 124 of FIG. 1).

Each node of FIG. 2 also includes a virtual server (VS) 215 and 216. It is noted, however, that a virtual server may also provide for the virtual aggregation of resources from different nodes that are accessed by clients via a protocol such as iSCSI or NFS multiple nodes in a cluster. A virtual server may maintain information and control data flow between a client and storage resources. For example, a client may not have awareness over where data associated with that client resides in a cluster, which nodes or disk drives are assigned to the client for future storage, and the like. Embodiments may synchronize these virtual servers to facilitate fast switchover of resources in the event that a primary node is taken offline.

In one embodiment, client 230 may be assigned to an active virtual server VS1 215 whereupon configuration information, e.g. information regarding what portion of the storage resources are being used by the client and information from other subsystems that handle configuration (such as protocol specific control information, etc.), are known by VS1 215. VS1 215 may be replicated on DR node 221 at a dormant virtual server VS1 215 whereupon configuration information regarding what portion of the DR storage resources are, being used by client 230 may be maintained.

Accordingly, for DR resources embodiments may replicate data corresponding to a client on both a data plane and a control plane. The data plane may include any data structures which facilitate the storage and reading of payload data from a client. The data plane comprises both an asynchronous component(s) and a synchronous component(s) (or near synchronous due to transmission delay and the like). Specifically, write cache 213 on node 211 may be synchronously replicated with write cache 213 on DR node 221. Storage portion 214 of node 211 may be replicated to storage 214 on DR node 211 in an asynchronous manner utilizing consistency points and write cache 213. The control plane may include components and processing resources which implement or control where or how data is stored on the data plane (e.g. which resources of storage portion 214 are utilized and the like). On the control plane, virtual servers, such as VS1 215 may be replicated at a separate VS1 215. In this case, when a primary node becomes nonfunctional, VS1 215 may become dormant and the previously dormant VS1 215 may become the active virtual server.

With both the data plane and control plane information, embodiments may implement switching between nodes, e.g. in the event of a DR situation, in a manner that provides minimal interruption to a client. Further, in some instances, a switchover may be implemented in a manner that is transparent to the client. For example, configuration information may be replicated among virtual servers such that a client will continue to recognize that communication paths are available for storing data, even if such paths are changing, in order to prevent an error which interrupts the client's functionality.

Additionally, embodiments may implement a switchback routine in a similar manner. For example, in the event that primary node 211 loses communication within DR/HA storage network 200, storage network 200 may cause client 230 to utilize DR resources after transitioning as described above. When primary node 211 comes back online, storage network 200 may cause the appropriate information from DR node 221 to be replicated back to primary node 211 in order to allow for a switchback routine.

It is noted that write cache 213, storage 214 and virtual servers 215 may be mirrored to other nodes under control of management server 250. Alternatively, management server 250 may provide primary node 211 with the information on where to send mirror data and primary node 211 may send multiple mirroring data signals to other portions of network 200, e.g. to HA node 212 and DR node 221. Further control may be implemented by a combination of management server 250 and processing resources within a node (e.g. by M-Host 121).

In some embodiments, a storage network such as networks 100 and 200 may be further configured such that an administrator may cause the switchover from a primary node to a secondary node (such as a DR node) with an explicit command, as opposed to prior art methods which require multiple steps, manual configurations, and the like. For example, an M-Host resource within a node such as nodes 110, 120, 211 and 221, may be configured with a Disaster Recovery Coordinator (DRC) which is configured to convert a user command from an administrator into multiple tasks for the storage network to implement. Specifically, the DRC may identify the nodes participating in a DR switchover operation, relegate the appropriate task(s) to each node for the operation, wait for each node to complete the task, and, finally, notify the administrator of the status of the operation across the cluster.

A DRC may be responsible for mapping the remote nodes that need to be switched-over and identify which nodes will participate in a switch operation (and/or a switch back operation). This may be implemented with or without administrator assistance. The DRC may also act as a state machine and monitor/manage the states of a transition between the use of storage resources.

Figure 3:
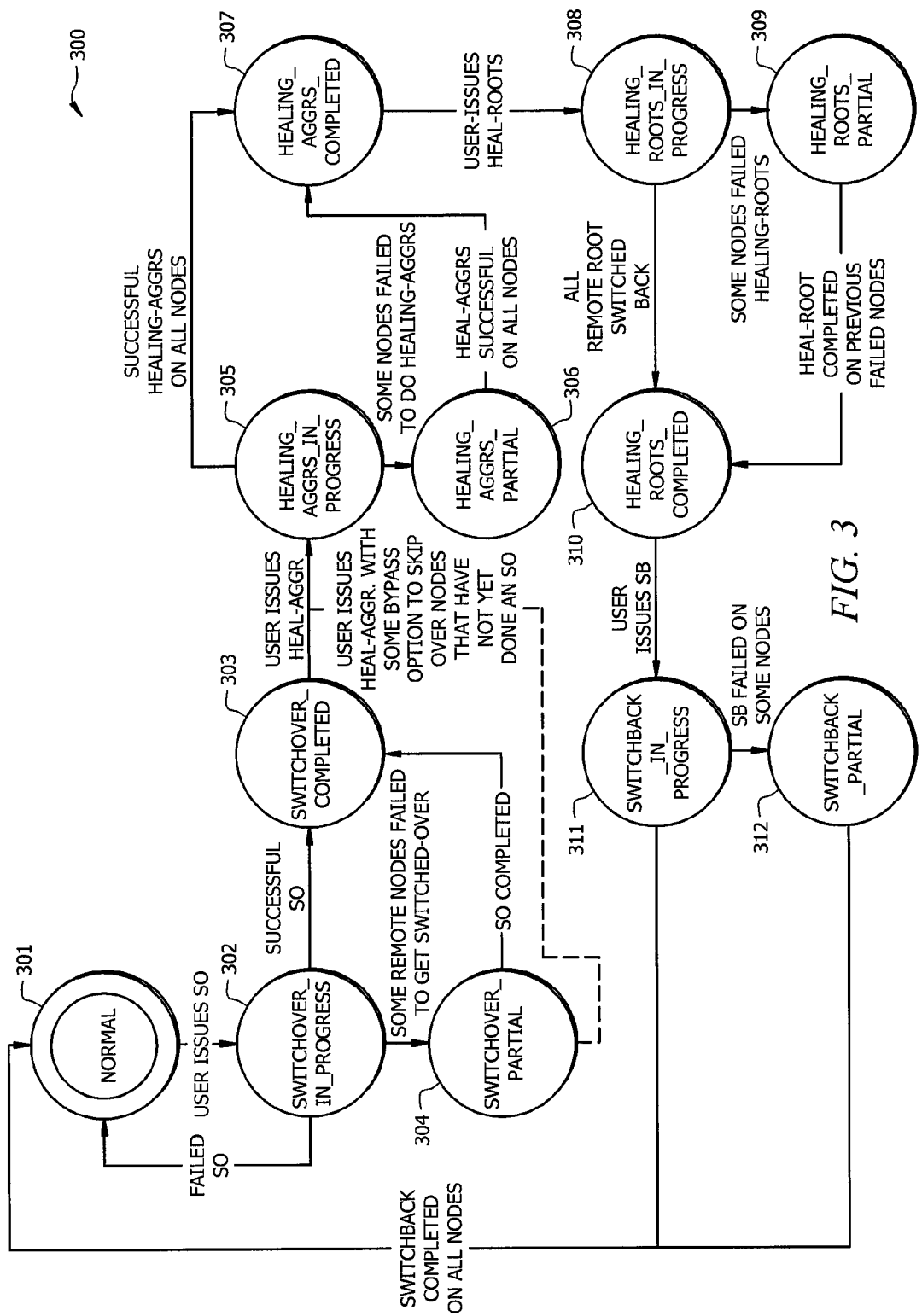
FIG. 3 illustrates a state diagram corresponding to various states of the DRC in accordance with an embodiment of the present application.

FIG. 3 illustrates a state diagram 300 corresponding to various states of the DRC in accordance with an embodiment of the present application. During normal operations of the storage network, the state of the DRC will be at normal 301. State 302 reflects that a switchover is in progress, such as a switchover of a client from a primary node to a DR node. Such a switchover may be automatically caused as a result of a node going offline or may be started as a result of an administrator commanding the switchover. In the event of a successful switchover (e.g. all nodes have been switched over correctly) the state reflects that the switchover is completed at 303. If at least one node has switched over, but there are remaining nodes that have not successfully switched over, a partial switchover state is reflected at 304.

When the switchover has completed (or during the switchover), DRC may begin healing the aggregates (assuming there is a problem with the primary nodes) at 305. State 306 reflects that the healing is partially completed with respect to the nodes and the healing continues until it is completed at state 307. At this point, healing of the root disks of the source cluster mode may begin at 308. Healing the roots causes the switched over root aggregates to be switched back to the source cluster so that the source cluster nodes can boot up before switchback occurs. While root aggregates are not healed on all nodes (at 309), switchback commands will be rejected until the healing of the roots is completed at 310. At that point, a switchback command may be implemented to cause the switchback to begin at 311. The switchback will reflect as partially complete at 312 until it is successful on all nodes and the state returns to normal 301.

The DRC may also be in communication with a DR switch over monitor (DR-SOM) and DR disk ownership manager (DR-DOM) processing resources/modules residing in a node. DR-SOM may be implemented as a reactive system that collects data from outside events and outputs data to change external environments. Specifically, DR-SOM may process/interpret external commands and cause various switchover/switchback operations to occur on the node level. For example, during a switchover operation, DR-SOM coordinates the interactions between sub-systems in a specified order. Each sub-system performs a specific task to complete the switchover or switchback. Instead of requiring an administrator to run a command to perform a sub-system specific task, DR-SOM directly invokes the sub-system to carry out that task. DR-DOM is an example of such sub-systems. DR-DOM may comprise the sub-system concerned with disk ownership changes that occur during switchover or switchback. Additionally, DR-DOM may function to receive commands from DR-SOM during a switchover process to change disk ownership from, e.g., a disaster stricken site to a surviving site. During switchback, DR-SOM may invoke DR-DOM to revert disk ownership back to the source site.

Accordingly, embodiments may provide for single command switchover functionality where an administrator requests a switchover and processing resources on the storage network, e.g. the DRC, DR-SOM, and DR-DOM, and implement the coordination of each of the subsystems required to change configurations during a switchover between clusters and nodes. It is further noted that these resources may function similarly to provide a single command switch back operation.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
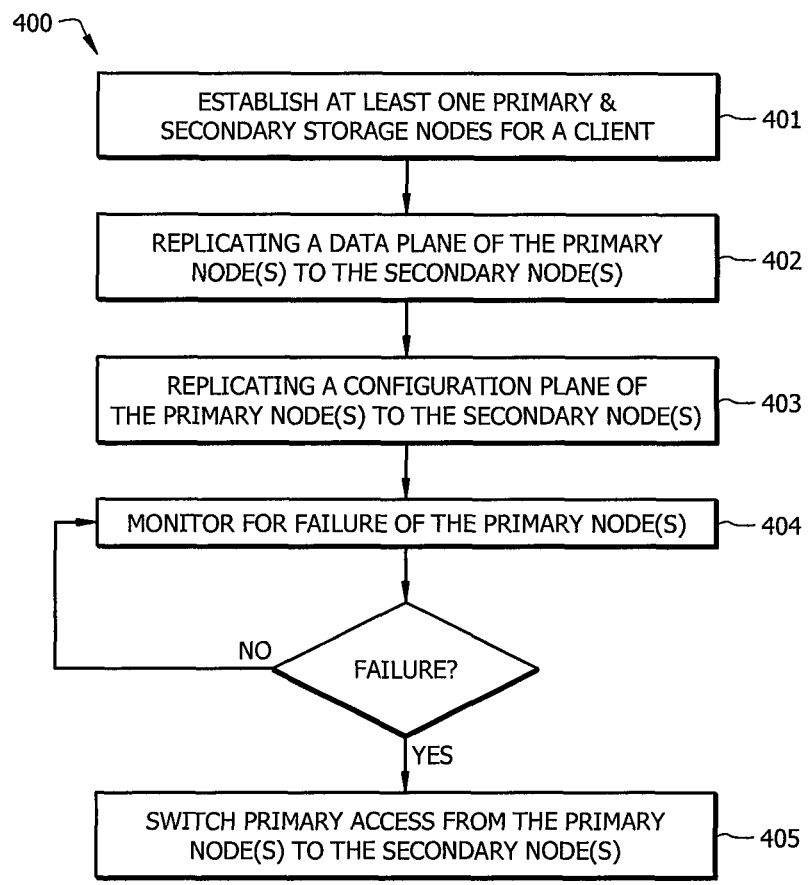
FIG. 4 illustrates a method for administering DR functionality in a storage network in accordance with an embodiment of the present application.

FIG. 4 illustrates a method 400 for administering DR functionality in a storage network in accordance with an embodiment of the present application. It is noted that embodiments of method 400 may be implemented within the storage networks described above with respect to FIGS. 1-3. Specifically, method 400 may include, at block 401, establishing at least one primary storage node and at least one secondary storage node for a client.

At block 402, method 400 may include replicating a data plane of the primary node(s) to the secondary node(s). Replicating the data plane may include replicating both an asynchronous resource such as a drive in a node and/or storage array, and a synchronous resource such as a cache buffer. Additionally, at block 403, a configuration plane for the primary node(s) is replicated for use by the secondary node(s). Replication of the configuration plane may include replicating configuration information relating to the location/storage of data from a client one or more storage resources. For example, replication of configuration information may include replicating one or more virtual servers which function at a cluster level and administer to one or more nodes. Further, such replication may cause the virtual server on a secondary node to be dormant until activated at the point of a switchover.

After the nodes are established and replication is taking place, method 400 may include, at 404, monitoring for failure of primary storage node. In the event that no failure is present, the storage system continues to monitor for failures at block 404. Upon recognizing a failure of the primary node, method 400 may include at 405, switching the client from having primary access with the primary storage node to having primary access with the secondary storage node. Such a switch may be made automatically, or in response to a manual command provided by an administrator. In some embodiments, the storage system may be configured such that in response to a switch command, processing devices in the system may implement the switch without additional configuration instructions from an administrator.

Figure 5:
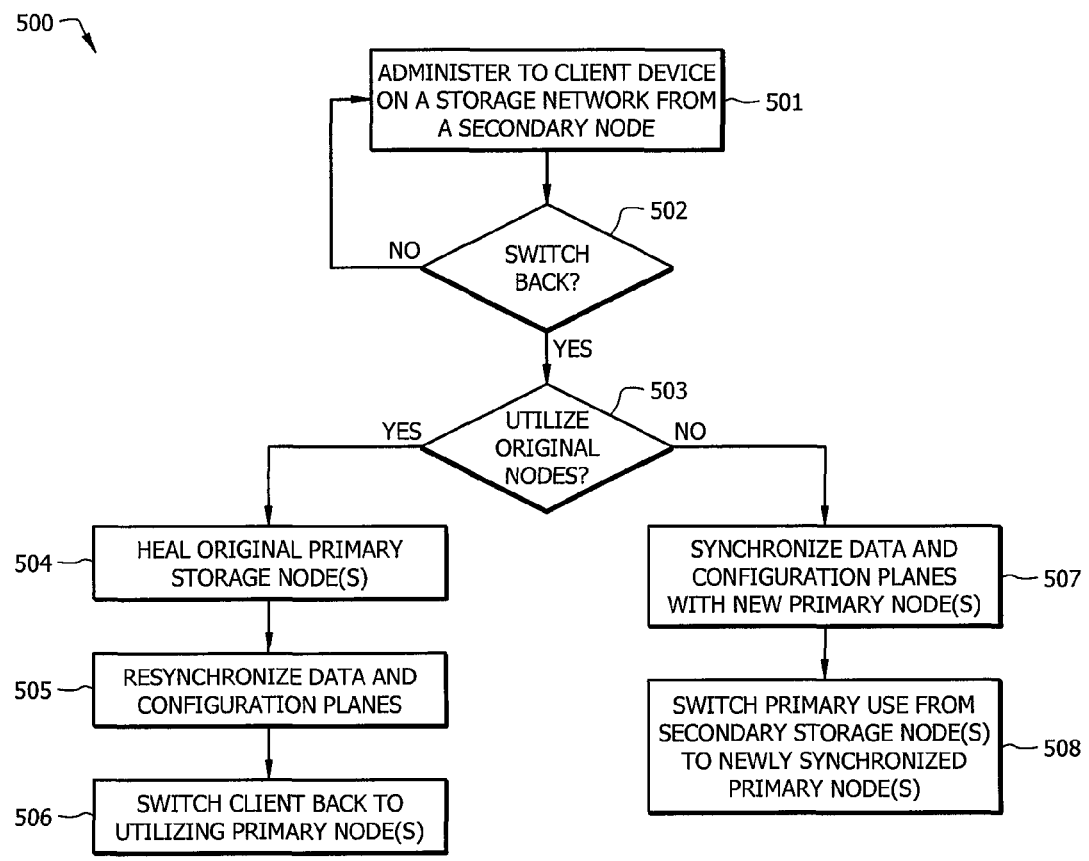
FIG. 5 illustrates a method for administering DR functionality within a storage network in accordance with an embodiment of the present application.

FIG. 5 illustrates a method 500 for administering DR functionality within a storage network in accordance with an embodiment of the present application. More specifically, method 500 provides an example flow for conducting a switchback operation. It is noted that as with the above method, embodiments of method 500 may be implemented within the storage networks described above with respect to FIGS. 1-2. Method 500 begins at block 501 with administering to a client device and providing storage resources at least one secondary storage node. At decision block 502, a determination of whether a switchback process is desired is made. In the event that a switchback is not wanted, method 500 continues functioning with the at least one storage node at 501.

If a switchback operation is in order, at decision block 503 method 500 determines whether the switch is switching back to one or more original primary storage nodes or switching to utilize different nodes as a primary storage resource (e.g. different nodes within the original cluster, or a different cluster). If switching to the original nodes, method 500 may include, at 504, healing the primary storage node(s). Once the primary storage nodes are healed, the data and configuration planes are resynchronized at block 505 and the switchback may be completed at 506 with the client switching back to utilizing nodes on the primary storage resource for a primary storage node. Such a switchback may be implemented in a similar manner as the original switchover.

In the event that the switchback will be directed to different nodes than the original primary storage nodes, method 500 may include synchronizing data and configuration planes with the new nodes at 507 and switching the primary use from the secondary storage node to the newly synchronized nodes at 508.

The functional blocks and modules of the above FIGS. 1-5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It is also appreciated that the systems and method described herein are able to be scaled for larger storage network systems. For example, a cluster may include hundreds of nodes, multiple virtual servers which service multiple clients and the like. Such modifications may function according to the principles described herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for administering disaster recovery resources in a storage network, said method comprising:
    replicating, by a storage management computing device, a data plane and a configuration plane corresponding to at least one primary node to at least one secondary storage node for a client device in communication with the storage network;
    monitoring, by the storage management computing device, the at least one primary node for a failure in communication within the storage network;
    switching, by the storage management computing device, primary access for the client device from the at least one primary node to the at least one secondary storage node in the event that a failure in the at least one primary node is recognized, the switching further comprising healing the at least one failed primary node and switching primary access for the client device back from the at least one secondary storage node to the healed at least one primary node; and
    providing, by the storage management computing device, a switching status notification indicating progress of the switching primary access for the client device from the at least one primary node to the at least one secondary storage node and a healing status notification indicating progress of healing the at least one failed primary node.

2. The method of claim 1 wherein replicating a data plane comprises replicating, by the storage management computing device, an asynchronous resource and a synchronous resource configured to store data from the client device.

3. The method of claim 1 wherein replicating a configuration plane comprises replicating a virtual server.

4. The method of claim 3 wherein the replicated virtual server is configured to be dormant on the at least one secondary storage node while the at least one primary node is functioning.

5. The method of claim 1 further comprising resynchronizing, by the storage management computing device, data and configuration planes to the healed at least one primary node.

6. The method of claim 1 further comprising receiving, by the storage management computing device, a command to switch from the use of the at least one primary node to the use of the at least one secondary storage node.

7. The method of claim 6 further comprising automatically, by the storage management computing device, determining and implementing switchover tasks within processing resources of the storage network.

8. The method of claim 7 further comprising managing which nodes are to be switched in response to a switchover command.

9. A storage management computing device comprising:
    a processor;
    a memory coupled to the processor which is configured to be capable of executing programmed instructions comprising and stored in the memory to:
        replicate a data plane and a configuration plane of at least one primary node to at least one secondary storage node for a client device in communication with a storage network;
        monitor the at least one primary node for a failure in communication within the storage network;
        switch primary access for the client device from the at least one primary node to the at least one secondary storage node in the event that a failure in the at least one primary node is recognized, the switching further comprising healing the at least one failed primary node and switching primary access for the client device back from the at least one secondary storage node to the healed at least one primary node; and
        provide a switching status notification indicating progress of the switching primary access for the client device from the at least one primary node to the at least one secondary storage node and a healing status notification indicating progress of healing the at least one failed primary node.

10. The device of claim 9 wherein replicating a data plane comprises replicating an asynchronous resource and a synchronous resource configured to store data from the client device.

11. The device of claim 9 wherein replicating a configuration plane comprises replicating a virtual server.

12. The device of claim 11 wherein the replicated virtual server is configured to be dormant on the at least one secondary storage node while the at least one primary node is functioning.

13. The device of claim 9 wherein the processor coupled to the memory is further configured to be capable of executing at least one additional programmed instruction comprising and stored in the memory to resynchronize data and configuration planes to the healed at least one primary node.

14. The device of claim 9 wherein the processor coupled to the memory is further configured to be capable of executing at least one additional programmed instruction comprising and stored in the memory to receive a command to switch from the use of the at least one primary node to the use of the at least one secondary storage node.

15. The device of claim 14 wherein the processor coupled to the memory is further configured to be capable of executing at least one additional programmed instruction comprising and stored in the memory to automatically determine and implementing switchover tasks within processing resources of the storage network.

16. The device of claim 15 wherein the processor coupled to the memory is further configured to be capable of executing at least one additional programmed instruction comprising and stored in the memory to manage which nodes are to be switched in response to a switchover command.

17. A non-transitory computer readable medium having stored thereon instructions for administering disaster recovery resources in a storage network comprising executable code which when executed by a processor, causes the processor to perform steps comprising:
    replicating a data plane and a configuration plane of at least one primary node to at least one secondary storage node;
    monitoring the at least one primary node for a failure in communication within the storage network;
    switching primary access for the client device from the at least one primary node to the at least one secondary storage node in the event that a failure in the at least one primary node is recognized, the switching further comprising healing the at least one failed primary node and switching primary access for the client device back from the at least one secondary storage node to the healed at least one primary node; and providing a switching status notification indicating progress of the switching primary access for the client device from the at least one primary node to the at least one secondary storage node and a healing status notification indicating progress of healing the at least one failed primary node.

18. The medium claim 17 wherein replicating a configuration plane comprises replicating a virtual server.

19. The medium of claim 18 wherein the replicated virtual server is configured to be dormant on the at least one secondary storage node while the at least one primary node is functioning.

20. The medium of claim 17 further comprising resynchronizing data and configuration planes to the healed at least one primary node.

21. The medium of claim 17 further comprising receiving a command to switch from the use of the at least one primary node to the use of the at least one secondary storage node.

22. The medium of claim 21 further comprising automatically determining and implementing switchover tasks within processing resources of the storage network.

23. The medium of claim 22 further comprising managing which nodes are to be switched in response to a switchover command.

\* \* \* \* \*